(12) United States Patent
Dumitrescu et al.

(10) Patent No.: US 12,610,286 B1
(45) Date of Patent: Apr. 21, 2026

(54) RESOURCE RESERVATION IN LATENCY CONSTRAINED PACKET TRANSMISSION NETWORKS

(71) Applicant: Canoga Perkins Corporation, Chatsworth, CA (US)

(72) Inventors: Razvan Tudor Dumitrescu, Ottawa (CA); Brett Michael Bergquist, Watertown, CT (US); Steven Trent Hannay, Shelton, CT (US); Lucas Koy Lawrence, Castaic, CA (US)

(73) Assignee: CANOGA PERKINS CORPORATION, Chatsworth, CA (US)

( * ) Notice: Subject to any disclaimer, the term of this patent is extended or adjusted under 35 U.S.C. 154(b) by 379 days.

(21) Appl. No.: 18/218,626

(22) Filed: Jul. 6, 2023

Related U.S. Application Data

(60) Provisional application No. 63/388,418, filed on Jul. 12, 2022.

(51) Int. Cl.
| | |
|---|---|
| *H04W 28/26* | (2009.01) |
| *H04L 43/0852* | (2022.01) |
| *H04W 24/06* | (2009.01) |

(52) U.S. Cl.
CPC ......... *H04W 28/26* (2013.01); *H04L 43/0858* (2013.01); *H04W 24/06* (2013.01)

(58) Field of Classification Search
CPC .... H04W 28/26; H04W 24/06; H04L 43/0858
See application file for complete search history.

(56) References Cited

U.S. PATENT DOCUMENTS

| | | | | |
|---|---|---|---|---|
| 5,854,899 A | * | 12/1998 | Callon | .................... H04L 45/10 |
| | | | | 709/239 |
| 7,406,084 B2 | * | 7/2008 | Underwood | ....... H04B 10/2569 |
| | | | | 370/468 |
| 2004/0066785 A1 | * | 4/2004 | He | ...................... H04L 12/5601 |
| | | | | 370/395.21 |
| 2020/0045131 A1 | * | 2/2020 | Nigam | .................... H04L 67/60 |

FOREIGN PATENT DOCUMENTS

| | | | | |
|---|---|---|---|---|
| EP | 0756403 A2 | * | 1/1997 | ............. H04L 47/70 |
| WO | WO-2005013562 A1 | * | 2/2005 | ......... H04L 65/1069 |

* cited by examiner

*Primary Examiner* — Douglas B Blair

(74) *Attorney, Agent, or Firm* — Robert J. Everling

(57) ABSTRACT

Method and system is provided for deterministic resource reservation with guaranteed latency in packet transmission networks where packets have explicit end-to-end latency constraints.

12 Claims, 7 Drawing Sheets

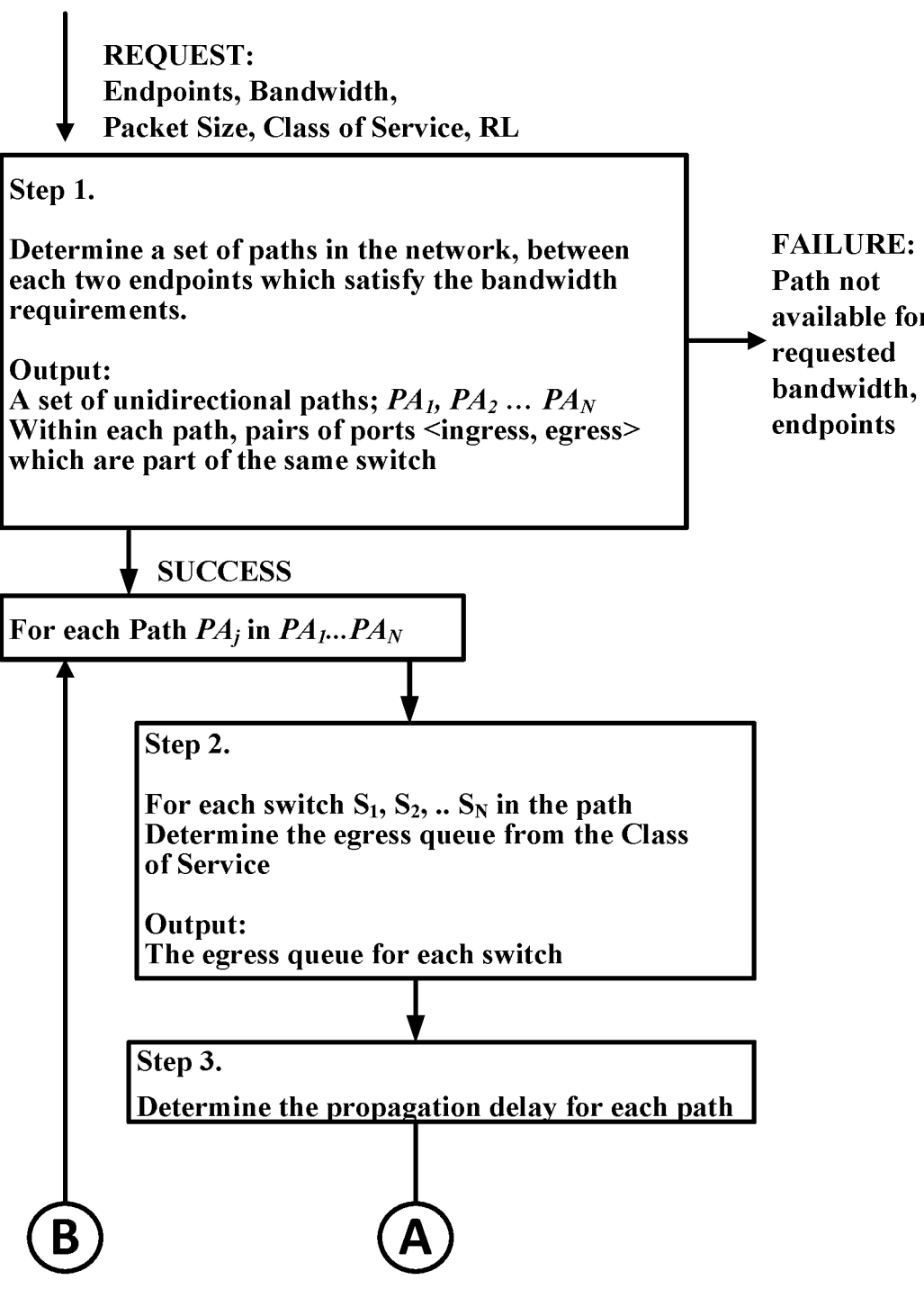

REQUEST:
Endpoints, Bandwidth,
Packet Size, Class of Service, RL

Step 1.

Determine a set of paths in the network, between each two endpoints which satisfy the bandwidth requirements.

Output:
A set of unidirectional paths; $PA_1$, $PA_2$ ... $PA_N$
Within each path, pairs of ports <ingress, egress> which are part of the same switch

FAILURE:
Path not available for requested bandwidth, endpoints

SUCCESS

For each Path $PA_j$ in $PA_1$...$PA_N$

Step 2.

For each switch $S_1$, $S_2$, .. $S_N$ in the path
Determine the egress queue from the Class of Service

Output:
The egress queue for each switch

Step 3.

Determine the propagation delay for each path

Step 7(a)
Determine the worst case $T_{arrival}$ which represents the worst case arrival time for a packet from the newly created VC, relative to the empty queue event

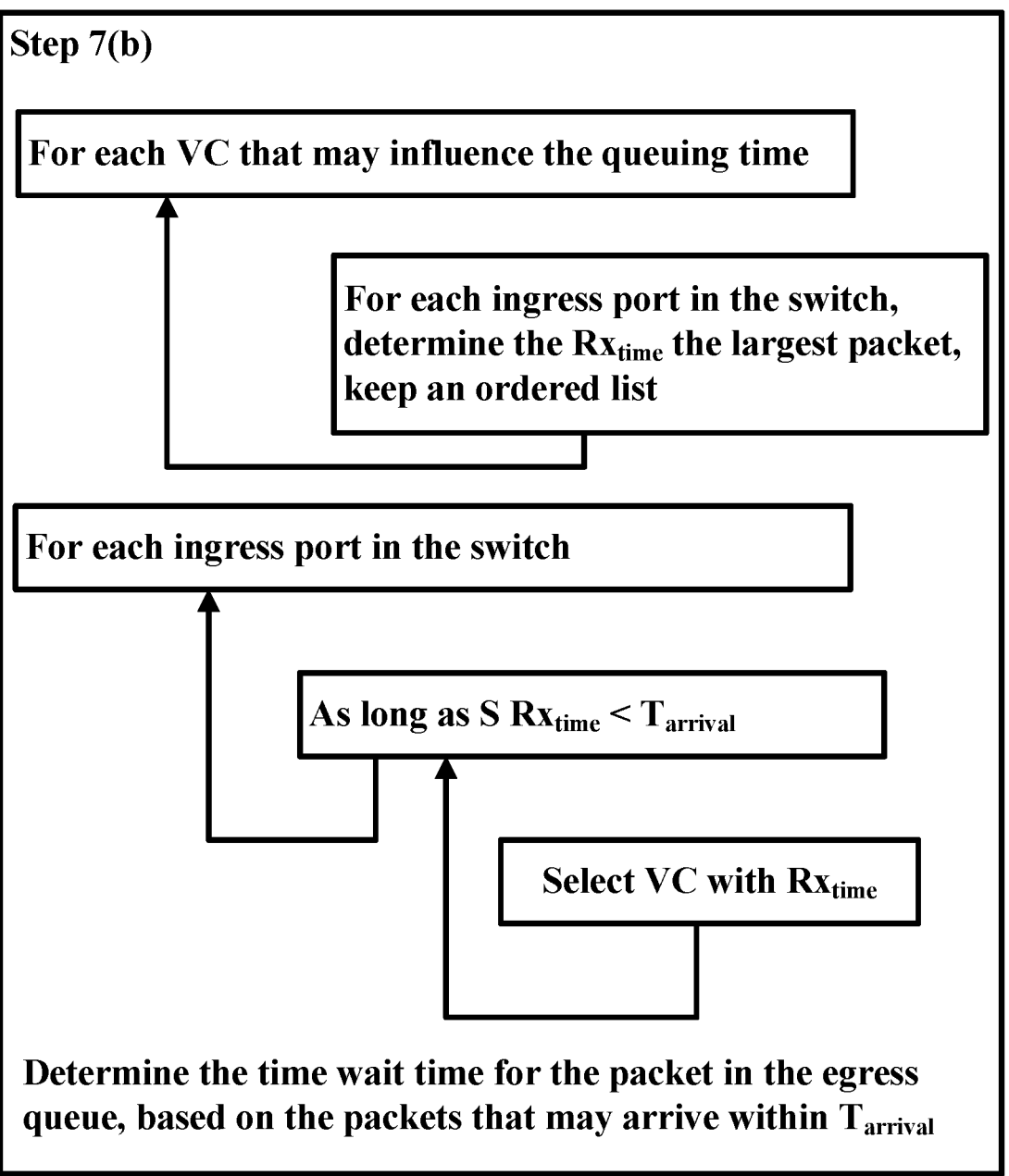

Step 7(b)

For each VC that may influence the queuing time

For each ingress port in the switch, determine the $Rx_{time}$ the largest packet, keep an ordered list For each ingress port in the switch As long as S $Rx_{time} < T_{arrival}$ Select VC with $Rx_{time}$ Determine the time wait time for the packet in the egress queue, based on the packets that may arrive within $T_{arrival}$

FIG. 5(a)

Step 7(c)

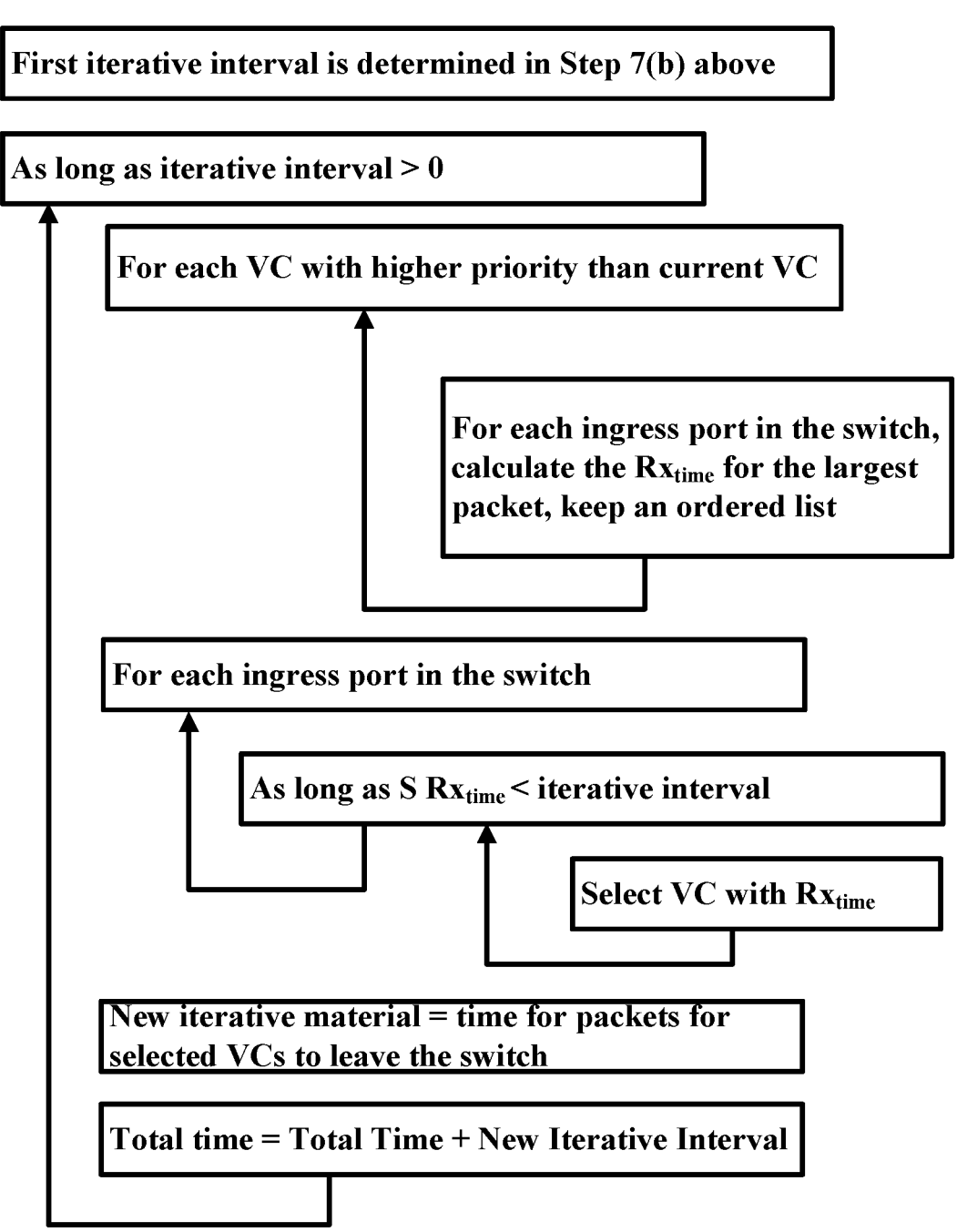

First iterative interval is determined in Step 7(b) above

As long as iterative interval > 0

For each VC with higher priority than current VC

For each ingress port in the switch, calculate the $Rx_{time}$ for the largest packet, keep an ordered list For each ingress port in the switch As long as S $Rx_{time}$ < iterative interval Select VC with $Rx_{time}$ New iterative material = time for packets for selected VCs to leave the switch Total time = Total Time + New Iterative Interval Determine the time wait time for the packet in the egress queue, based on the higher priority packets that may arrive after $T_{arrival}$ but before the packet leaves the switch

FIG. 5(b)

RESOURCE RESERVATION IN LATENCY CONSTRAINED PACKET TRANSMISSION NETWORKS

CROSS-REFERENCE TO RELATED APPLICATIONS

This application claims priority to U.S. Provisional Application No. 63/388,418 filed Jul. 12, 2022, hereby incorporated by reference in its entirety.

FIELD OF THE INVENTION

The present invention relates generally to methods and systems for resource reservation in packet transmission networks and in particular, to such networks where packets have explicit end-to-end latency constraints.

BACKGROUND OF THE INVENTION

Traditional resource reservation methods focus on bandwidth reservation but cannot deterministically derive latency to guarantee latency in packet transmission networks.

In modern 5G fronthaul networks, a virtual circuit (VC) has stringent latency, bandwidth and resiliency requirements; to fulfill those requirements, resources must be reserved across the network. For example, a connection between a 5G antenna (5G Remote Radio Head unit) and a 5G C-RAN system in an industrial environment may require 12 Gbps of bandwidth and 25 microseconds maximum end-to-end latency. If the network cannot guarantee the end-to-end latency, the industrial equipment connected to the 5G network does not operate safely.

Connection (or virtual circuit) bandwidth and end-to-end latency concepts have been standardized in the art by several organizations (such as the Metro Ethernet Forum and the IEEE) and are widely used in the industry.

Multiple methods and algorithms are used in the art to guarantee bandwidth requirements for a specific connection in a packet transmission network. The key concept behind those methods is to allocate resources (that is bandwidth), for each specific virtual circuit, in all intermediate points in the network.

Physical entities in a network (such as ports, switch fabrics, links) have a fixed total bandwidth, determined by the physical characteristics of the entity, or by a specific configuration of the physical entity. For example, a physical port can have a total bandwidth of 10 Gbps, which means that no more than 10 Gigabits of data can pass through the port within 1 second. Each virtual circuit that is using a particular physical entity is reserving a specific amount of bandwidth resource from the available bandwidth. If the remaining available bandwidth on a physical entity cannot accommodate the bandwidth requirement of a new virtual circuit, the request for the new virtual circuit is not accepted by a network management system (NMS).

By way of an example, in FIG. 1 there are three virtual circuits, VCA, VCB and VCC. Each virtual circuit requires 3 Gbps bandwidth. Furthermore all ports in the network have a bandwidth of 10 Gbps. Once a virtual circuit is configured, it reserves bandwidth on each port it transits. For example, virtual circuit VCC reserves 3 Gbps in each of four ports designated S2-P3, S2-P1, S3-P3, and S3-P1 in the network. Once all three virtual circuits are created, the remaining available bandwidth on port S3-P1 will be 1 Gbps, which means that another 3 Gbps virtual circuit cannot use that port.

When a virtual circuit has its bandwidth reserved for all the ports on its path in the network, it means that (assuming enough buffering and queuing space in the network) all packets sent on the virtual circuit can reach their destination. There is no bottleneck in the network, where more traffic is sent than the physical entity can support, which will force packets to be dropped.

However, having reserved bandwidth does not provide any indication about the maximum latency for those packets; in other words, it does not put a deterministic upper bound on how long it will take for a packet to cross the network.

Object of the Present Invention

It is one object of the present invention to establish a resource reservation method and system between two endpoints in a packet transmission network where packets are sent to an ingress of the path at a predetermined rate, all packets reach the destination (no packet loss), and the overall end-to-end time (from ingress to egress endpoints) spent in the network by each packet is guaranteed to be less than a specified maximum latency threshold (end-to-end latency).

The system and method disclosed herein is novel and inventive over the prior art in addressing the guaranteed end-to-end latency requirement for a path in a network as defined herein and is distinguished over prior art focusing primarily on bandwidth requirements.

End-to-End Latency

As applied herein the end-to-end (network level) latency in the network is defined as the time elapsed from the reception by the first device in the network of the first bit of a packet at the ingress port of the first device in the network until the transmission of the last bit of the same packet at the egress port of the last device in the network.

By way of example, in FIG. 2 the end-to-end latency for the solid line path in network is the time elapsed from the reception at Port 4 of Switch 1 of the first bit of packet PK1 until the transmission at Port 2 of Switch 4 of the last bit of the same packet PK1.

BRIEF SUMMARY OF THE INVENTION

The system and method disclosed in the present invention allocates resources in a packet transmission network for virtual circuits which have strict bandwidth and end-to-end latency requirements. The mechanism is based on a series of steps and interactions between individual devices in the packet transmission network, as well as the devices and a network management system (NMS).

Individual devices in a packet transmission network measure and collect transmission delays between themselves and the directly connected peers. The collected delay measurements, together with information about the bandwidth for each port, is reported to the network management system. The network management system uses this information, collected from all devices in the network, in subsequent steps applied by network hardware executing process steps of the present invention in network configurations in particular applications.

In order to allocate the resources for a new virtual circuit with specified end-to-end latency and bandwidth constraints, the network management system has knowledge of the resources allocated for all previously created existing virtual circuits in the network.

When a request for a new virtual circuit is received, the network management system will determine, based on the steps described in this invention: (a) if a path exists in the network to satisfy the bandwidth requirements of the new virtual circuit, taking into account the bandwidth already reserved for the existing virtual circuits, then (b) if the path determined above satisfies the end-to-end latency requirements of the new virtual circuit, then (c) if adding the new virtual circuit to the path determined above does not affect delays for the existing virtual circuits to the extent that the extra delays are larger than the end-to-end latency constraints for the existing virtual circuits.

If the network management system cannot find a path for a new virtual circuit which satisfies the conditions (a), (b) and (c) above, the request is rejected.

If a network path is found for the new virtual circuit, the network management system communicates with each individual device in the packet transmission network about the resources and parameters necessary to configure the new virtual circuit.

The above and other aspects of the present invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1:
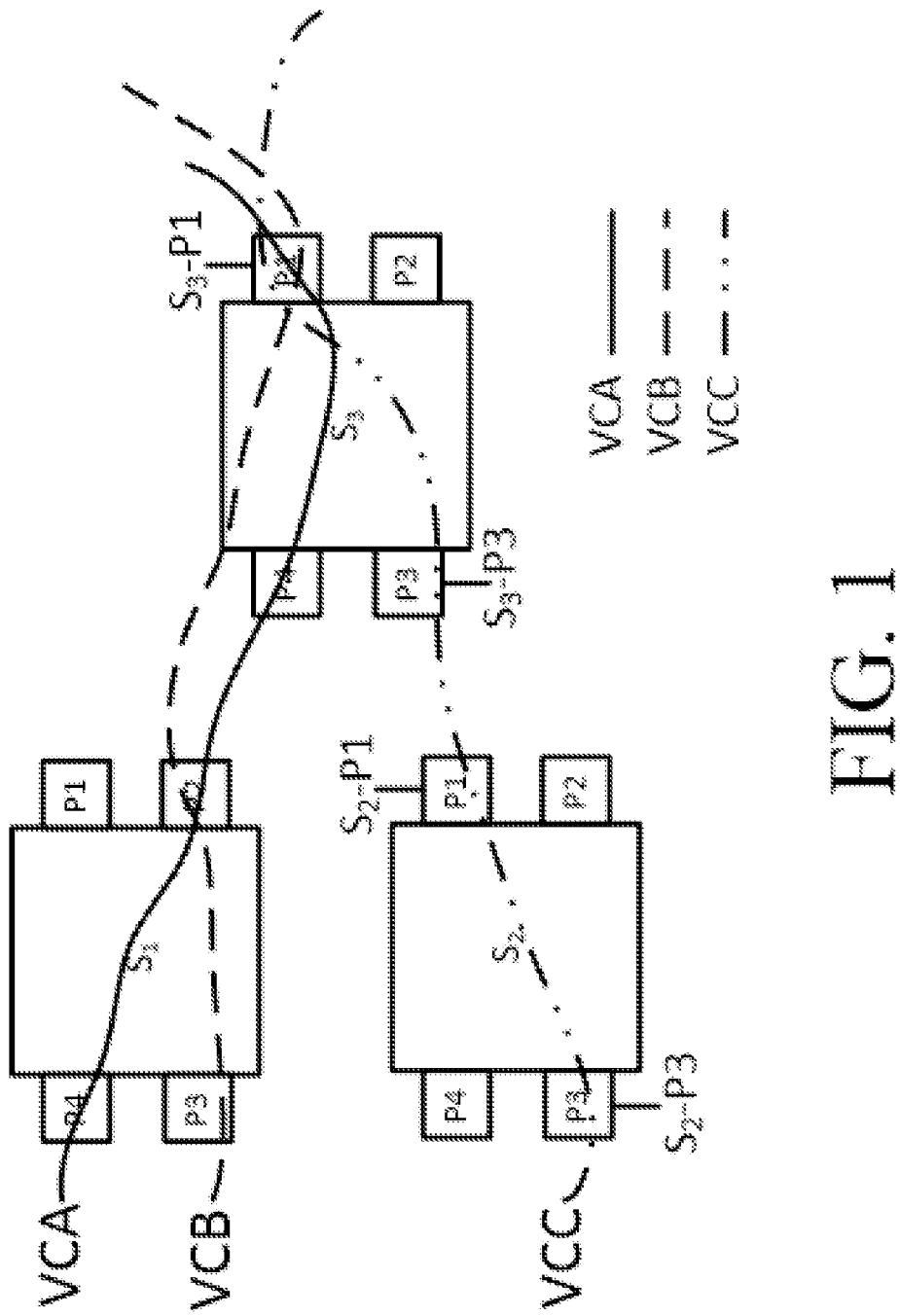
FIG. 1 illustrates the concept of bandwidth reservation.
Figure 2:
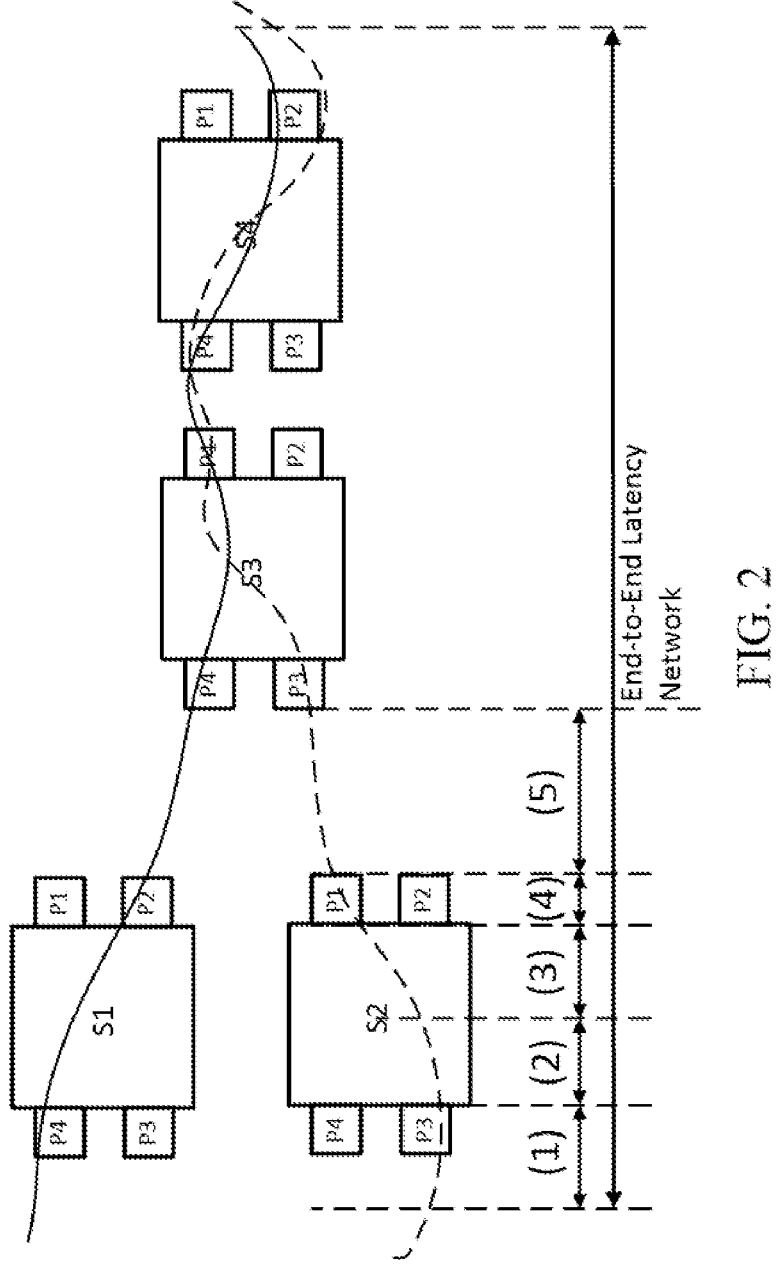
FIG. 2 illustrates multiple time components associated with end-to-end latency in a packet transmission network from network ingress to network egress.

Determination of end-to-end latency for the present invention of resource reservation contains multiple time components, as identified in FIG. 2 and components (1) to (5) below.

Component (1) $Rx_i$: time spent to fully receive a packet in the first switch in the network, which can be determined from the packet size and the speed of the ingress interface. For example, for a packet of 1024 bytes, received on a 10 Gbps interface, the time spent to fully receive the packet is 819.2 nanoseconds.

Component (2) $Process_i$: time spent to process the packet and to decide where the packet should be forwarded, which time depends on implementation and specific hardware characteristics of a given switch (device), and is the same for all packets.

Component (3) $Queue_i$: time spent by the packet waiting in a queue to be sent out.

Component (4) $Tx_i$: time spent to transmit the packet out of a switch, which can be determined by the packet size and the speed of the egress interface.

Component (5) $Propagation_i$: time spent between switches in the network, which depends on the length of the connection between switches and can be measured empirically by using methods known in the art, such as the protocol described in ITU-T Y.1731 (2011) specification.

The same time sequence (1) to (5) repeats for each switch in the network path. However, within the network, the time to transmit the packet out of a switch ($Tx_i$) is the same as the time to receive the packet in switch ($Rx_{i+1}$) since the packet does not change in length between consecutive switches, and the interface speed for two interconnected ports is the same. Consequently, when determining the end-to-end latency, this delay is added only once for each pair of interconnected switches.

In summary in the present invention the end-to-end Total Latency for a packet traversing N switches ($S_1$, $S_2$, . . . $S_N$) in the network can be determined as:

$$\text{Total Latency} = \sum_{i=1}^{N} (Rx_i + Process_i + Queue_i + Propagation_i) + Tx_N$$

The time spent to transmit the packet out of last switch ($S_N$) in network must be counted separately ($Tx_N$), as the definition of end-to-end latency includes the time until the last bit of the packet leaves the network.

The end-to-end latency depends explicitly on:

(a) Network topology: different aspects of the network topology (for example, switch processing performance and distance between switches) have specific impacts on end-to-end latency.

(b) Pre-existing network configuration: the end-to-end latency for a new virtual circuit path in the network depends on the traffic and parameters of the existing paths since the existing traffic determines the queue delays.

A queue delay represents the time a packet spends in an egress queue of a particular switch; this time varies dynamically with each packet and depends on the number and size of other packets waiting in the egress queues. A typical network switch has multiple egress queues for each port with each of the multiple egress queues having different scheduling priorities. Packets that are waiting in higher priority queues are sent before packets waiting in lower priority queues.

In one embodiment of the present invention for resource reservation a queue delay can be divided into two components:

Component (1): Interference delay which is the time it takes for a low priority packet to be sent out if the packet transmission is already in progress when the higher priority packet arrived.

Component (2): Aggregation delay which is the time it takes for a packet to wait in the egress queue, due to packets at a higher priority or the same priority arriving on different ports.

Queue Delays and Aggregation Bursts

A virtual circuit in a network requires the availability of two resources at the same time: bandwidth and latency.

As discussed above, reserving bandwidth resources for a virtual circuit across network devices is known in the art.

If the reserved bandwidth is less than the total bandwidth across a network path, then all packets will arrive at the destination (last port in the network), assuming infinite buffers and no physical disruptions. However it is not known how long it will take a packet to traverse the network. The time a packet spends in the network depends on the traffic pattern (rate and packet sizes) from other virtual circuits and if those packets, from all the flows at the same time, create bursts.

Figure 3:
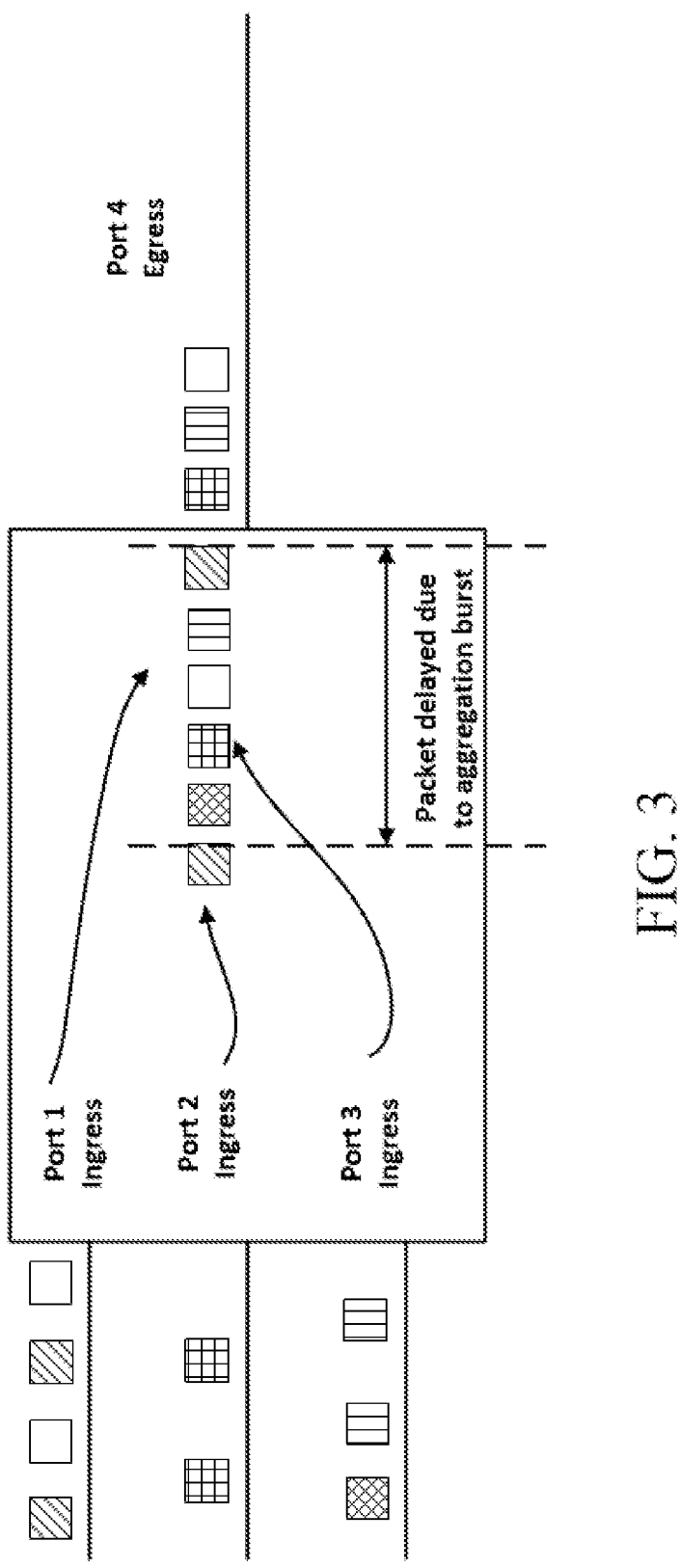
FIG. 3 illustrates occurrence of bursts which occur when traffic from multiple sources arrives at the same time in a device in a packet transmission network.
Figure 4B:
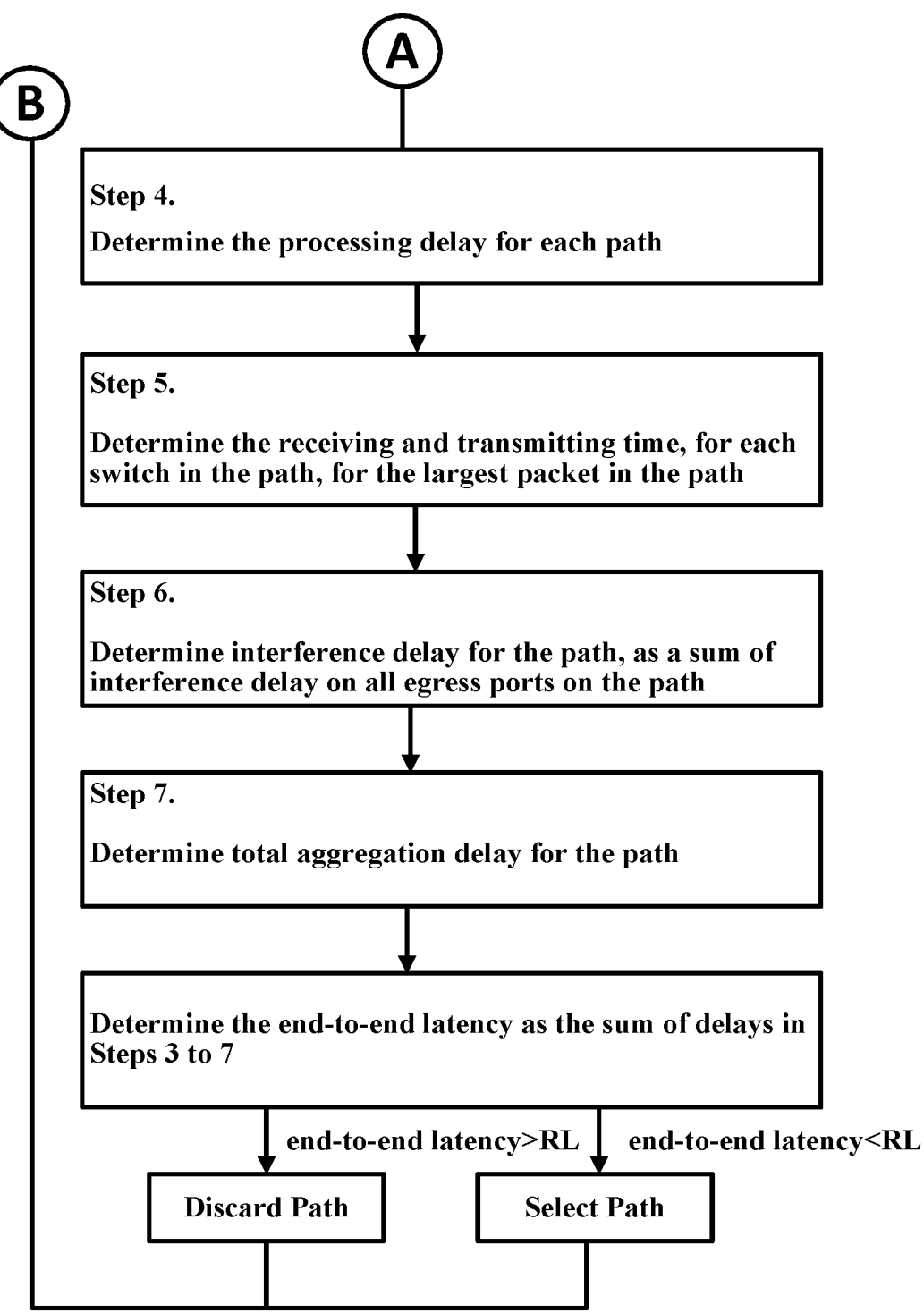
FIG. 4($a$), FIG. 4($b$), FIG. 5($a$) and FIG. 5($b$) diagrammatically illustrate multiple embodiments of the present invention.

For example, in FIG. 3 packets for multiple virtual circuits (with packets coded differently for each virtual circuit) are arriving from different ingress ports and create an aggregation burst at the egress Port 4 which means that packets belonging to the same virtual circuit may be delayed due to traffic from other virtual circuits.

In other words, aggregation bursts, which are the result of packets from different sources arriving on a switch at the same time, are the reason of dynamic delays in the queues.

Since the aggregate traffic of all virtual circuits on all links is less than the total bandwidth of the link, it means that bursts, no matter how big, will periodically taper off. There will be a time window, with a periodic frequency, when a particular egress queue is empty. How often that queue empty time window occurs can be determined from the aggregate allocated bandwidth (the bandwidth of all virtual circuits crossing a particular link) versus the transmission speed of the port. The periodic burst/empty queue cycle allows the establishment of a baseline $T_0$ for the purposes of this methodology, defined at the time when the first packet arrives at an empty queue. When the first packet arrives at an empty queue, the burst size is 0 (there is no burst), and the packet is transmitted right away, with no delay.

Every flow that is aggregating on a particular egress queue has a bandwidth of less than or equal to the aggregated bandwidth of the flows going through the egress queue, which itself is less than the physical bandwidth of the egress queue. Therefore within a burst window, a packet from a particular virtual circuit can appear only once; the next packet from the same flow will be at least $$t = \frac{PacketSize}{Bandwidth}$$

apart, which is already in the next burst window.

A worst case scenario is all packets that can theoretically produce a burst arrive all at the same time, followed by a time interval where no packets are arriving. All packets that can produce a burst means one packet from each flow, up to a certain time. To estimate the time a packet spends in the network in the present invention, end-to-end latency, the size of the potential bursts in each of the switches in the path needs to be estimated as disclosed elsewhere herein.

Methodology for Resource Reservation for Latency Constrained Virtual Circuits

In the present invention of resource reservation in latency constrained packet transmission networks to guarantee latency constraints for all virtual circuits in a given network, the following methodology is applied.

A request for a new virtual circuit (Prospective Virtual Circuit) typically contains: a set of two endpoints in a network, a bandwidth requirement for the virtual circuit; packet sizes used by the new virtual circuit; the class of service for the new virtual circuit which determines the egress queue used by the new virtual circuit in each switch; as well as the required latency (RL) for the new virtual circuit, measured between the two endpoints specified in the set of endpoints above.

There is a centralized or distributed network management system which receives and processes the request for a new virtual circuit. This system has direct or indirect knowledge of the network topology, speeds for each interface in the network, propagation delays between switches and all virtual circuits previously configured in the network.

The term network device (or switch) as used herein defines any physical network device having a bandwidth limitation. The term switch as used herein also refers to any physical network device.

One embodiment of the present invention comprises steps (1) through (7) below and is illustrated in FIG. 4(a) through FIG. 5(b).

In step (1) the network management system determines and stores a set of Candidate Paths in the network that satisfy the bandwidth requirements of a Prospective Virtual Circuit. The applied methodology for this determination can be based upon prior art developed, for example, by the Metro Ethernet Forum and the IEEE.

Each of the Candidate Paths in the set of unidirectional Candidate Paths is described by the notation $\{P<E_i, E_j, 1<=i,j<=n; i\neq j\}$ such that each path connects two endpoints in the Prospective Virtual Circuit request. Each path is represented by an ordered set of ports, starting from $E_i$ and ending in $E_j$. Within each prospective path the ports are grouped in <ingress, egress> pairs that are ports of the same switch. Odd indexed ports in each path will be ingress ports, while the even indexed ports are the egress ports.

In step (2) for each switch $S_1, S_2 \ldots S_N$ identified by an <ingress, egress> pair in each of the stored Candidate Paths, the network management system identifies the egress queue corresponding to the Prospective Virtual Circuit. The egress queue is identified by the network management system from the class of service for the Prospective Virtual Circuit based on prior art methodology.

As an example, for each switch k in a Candidate Path, the network management system identifies $Q^k$ as being the egress queue used by the Prospective Virtual Circuit in a particular switch within a Candidate Path. For example in switch k, the lowest priority queue is $Q^k_{min}$, while the highest priority queue is $Q^k_{max}$, with $Q^k_{min}=Q^k=Q^k_{max}$.

In step (3) propagation delays on the physical links, corresponding to each Candidate Path can be determined by measurement and reported directly by each switch to the network management system with methodologies known in the art. Propagation delays on physical links can be measured and reported to the network management system directly by each switch in a Candidate Path, using techniques such as ITU-T Y.1731 DMM, or the delays can be determined based on the known length of physical cables and the speed of light in the transmission medium (fiber, copper, etc.) forming the physical link. The Propagation Delay for each given Candidate Path that can be represented by the following notation as Propagation (Path) equation (1) for a Candidate Path having N switches.

$$\text{Propagation (Path)} = \sum_{link=Switch\ 1\ to\ Switch\ 2}^{link=Switch\ N-1\ to\ Switch\ N} \text{Propagation(link)} \quad (1)$$

In step (4) for each switch in each Candidate Path, the internal packet processing time is determined by the network management system based on a particular switch specification. The network management system will determine the Process delay for each given Candidate Path that can be represented by the following notation as Process (Path) equation (2) for Candidate Path having N switches.

$$Process\ (Path) = \sum_{S=Switch\ 1}^{Switch\ N} SwitchProcess\ (S) \qquad (2)$$

In step (5) for each ingress port in a Candidate Path, determine the receive time for the largest packet size in the set of packet sizes of the Prospective Virtual Circuit, and for each egress port in a path, determine the transmit time of the largest packet size in the set of packet sizes of the virtual circuit. The network management system determines the Receive and Transmit delay for each Candidate Path that can be represented by the following Receive Transmit(Path) equation (3).

$$ReceiveTransmit\ (Path) = Tx(Switch\ N) + \sum_{S=Switch\ 1}^{Switch\ N} Rx(S) \qquad (3)$$

In step (6), for each egress port in a Candidate Path, and each queue with a lower priority $Q^k_{min} <= Q_l < Q^k$ than the Prospective Virtual Circuit, the network management system determines the largest packet size among existing virtual circuits which are allocated to $Q_l$. The network management system stores the largest packet size among all queues with a lower priority than $Q^k$. The NMS determines the interference delay for that particular egress port in the path, by dividing the largest packet size determined as above by the egress port speed. The network management system determines the interference delay for the Candidate Path that can be represented by the following notation as Interference (Path) equation (4) for a Candidate Path having N switches.

$$Interference\ (Path) = \sum_{P=Egress\ port_1}^{Egress\ port_N} \frac{max_{Q_{min}}^{Q_k} MaxFrameSize\ on\ Queue}{PortSpeed\ (p)} \qquad (4)$$

In step (7), the network management system determines an aggregate delay for each egress port in a Candidate Path by executing three step (7) sub steps, namely: sub step 7(a) where the network management system determines the worst case "$T_{arrival}$" time that represents the worst case arrival time for a packet from a Prospective Virtual Circuit (PVC packet) relative to the empty queue event; sub step 7(b) where the network management system determines the "time wait" time for the PVC packet in each egress queue based on the PVC packet that may arrive within "$T_{arrival}$" time (initial egress delay); and sub step 7(c) where the network management system determines the "time wait" time for the PVC packet in each egress queue based on the higher priority packets that arrive after "$T_{arrival}$" time but before the PVC packet leaves the switch (subsequent egress delays).

In one embodiment of the invention step 7(a) for all queues of a higher or equal priority than $Q_k$ on the egress port the network management system identifies all previously configured virtual circuits that have paths containing the same <ingress port, egress port> as a Candidate Path. That is the network management system determines previously configured virtual circuits that are traversing the current switch between the same ports as the Prospective Virtual Circuit, of higher or equal priority than the priority of the Prospective Virtual Circuit. For each existing virtual circuit determined as such is retained the largest packet size from its packet size set. All those packet sizes on a Candidate Path are added together for a sum of packet sizes and divided by the ingress port speed by the network management system to derive $T_{arrival}$ that can be represented by the following notation as $T_{arrival}$:

$$T_{arrival} = \frac{\sum PacketSize}{ingress\ port\ speed}$$

This models the worst case scenario of the arrival time of a packet from the Prospective Virtual Circuit—the packet arrives after largest packets from all existing virtual circuits of higher or equal priority. $T_{arrival}$ represents the worst case arrival time (maximum arrival time) for a packet from the newly created Prospective Virtual Circuit, relative to the empty queue event ($T_0$).

Sub step 7(b) then determines which other packets, arriving on other ports but not the ingress port for the current virtual circuit, can arrive within $T_{arrival}$. For this, it is assumed that in the worst case, the largest packets from each ingress port are arriving first. A set of existing virtual circuits are determined which meet the following criteria:

- are assigned to a queue having priority higher than or equal to $Q_k$;
- the ingress port for those virtual circuits is different than the ingress port for the Prospective Virtual Circuit; and
- the egress port for those virtual circuits is the same as the egress port for the Prospective Virtual Circuit.

For each ingress port, loop through all virtual circuits satisfying the criteria above, considering the worst case scenario of largest packets arriving first. For each virtual circuit, determine the $Rx_{time}$ for each of the largest packets using the formula:

$$Rx_{time} = \frac{PacketSize}{ingress\ port\ speed}$$

In order to determine which packets may arrive within $T_{arrival}$, for each ingress port, loop through an ordered set of $Rx_{time}$ (from highest to lowest), and select the corresponding packet sizes as long as the sum of $Rx_{time}$ in the set is lower the $T_{arrival}$, or there are no other relevant virtual circuits on the ingress port.

Based on the operations described at sub step 7(a) and sub step 7(b) above, the worst case set of packets that may arrive and be queued at the egress port before a packet from the newly configured Prospective Virtual Circuit has been determined. Therefore, the packet from the newly configured Prospective Virtual Circuit will need to wait for those packets to be transmitted first. The wait time for the packet in the egress queue is:

$$T_{delay_0} = \frac{\sum PacketSizes\ selected\ at\ sub\ steps\ 7(a)\ and\ 7(b)\ above}{egress\ port\ speed} - T_{arrival}$$

In sub step 7(c) however, during this time (when the packet from the newly configured virtual circuit waits in the egress queue) it is possible that packets corresponding to higher priority traffic will arrive. Those packets will be sent out before the packet from the newly configured virtual circuit, which is waiting in the queue.

To determine this time, an iterative process is needed. In each iteration a determination is made of the set of packets of higher priority traffic (i.e. packets assigned to the same egress port but to higher priority queues than the newly configured Prospective Virtual Circuit) that may arrive during the previous iteration is determined. For the first iteration, a determination is made of the higher priority packets that may arrive during the $T_{delay0}$ time determined at sub step 7(b) above.

The result of the each iteration i step is a new delay, $T_{delay\ i}$—additional time that a packet from the newly configured Prospective Virtual Circuit might need to spend in the egress queue. Iteration i+1 will determine the packets arriving during $T_{delay\ i}$ (delay introduced by the previous iteration) and determine the corresponding $T_{delay\ i+1}$. The iterative process stops when the determined delay for an iterative step becomes 0.

As discussed above, the bandwidth allocation ensures that the egress queue bursts are periodic events and queues become empty periodically. Therefore, the iterative process has a finite number of steps.

To determine the packets arriving in each iteration, the methodology described in sub step 7(a) and sub step 7(b) above is used, however taking into account only packets assigned to queues with higher priority than the current queue ($Q_k$). In each iterative step, the lists of virtual circuits ordered by the largest packet size will be traversed starting from the endpoint of the previous iteration, and the reference time $T_{arrival}$ shall be replaced with $T_{delay\ i-1}$ (delay determined at the previous iteration).

The total aggregation delay for each port in the path is determined as:

$$\sum_{i=0}^{N} T_{delay_i} \qquad (5)$$

Where N is the total number of iterations, as disclosed above.

For each path, the total end-to-end latency is determined as the sum of the latencies determined in steps (3) to (7) above (equations (1) to (5)).

For a Prospective Virtual Circuit to satisfy the Required Latency (RL), the determined latency on any Candidate Path must be less than or equal to the Required Latency.

Furthermore, any Prospective Virtual Circuit added to the network may impact the latency of the virtual circuits already configured in the network. Network policies can require that end-to-end latencies for existing virtual circuits are redetermined once a Prospective Virtual Circuit is configured in one embodiment of the invention, and, if newly redetermined latencies for any of the existing virtual circuits are above their own Required Latency limits, the request for the Prospective Virtual Circuit will be rejected by the network management system.

Further variants of the present invention disclosed above determine the end-to-end latency using the worst case scenario, i.e. when the largest packets from all virtual circuits arrive in an egress queue at the same time. A variant of this methodology can instead take into account the statistical distribution of packets, based on the bandwidth (packet rates) for each virtual circuit.

Although the preferred embodiments of the present invention have been disclosed for illustrative purposes, the present invention is not limited to the construction and operation of those embodiments. In addition, those skilled in the art can understand that various changes and modifications can be made therein without departing from the subject matters of the disclosure and claims. Thus, such changes and modifications fall within the spirit and scope of the disclosure.

The invention claimed is:

1. A method for resource reservation in a latency constrained packet transmission network having one or more existing virtual circuits, the latency constrained packet transmission network governed by a network management system and having a plurality of interconnected switches each having one or more ingress ports and one or more egress ports, the method comprising:

receiving a request for a prospective virtual circuit having a bandwidth requirement to be added to the latency constrained packet transmission network, the prospective virtual circuit defined between two endpoints in the latency constrained packet transmission network and having a maximum latency threshold measured between the two endpoints;

determining one or more unidirectional candidate paths through the plurality of interconnected switches for the requested prospective virtual circuit;

wherein each candidate path is defined as an ordered set of paired ingress ports and egress ports through the plurality of interconnected switches that satisfies a bandwidth limitation of each switch of the plurality of interconnected switches along the candidate path and meets the bandwidth requirement of the prospective virtual circuit;

wherein each paired ingress port and egress port define a switch of the plurality of interconnected switches along the candidate path;

for each candidate path:

identifying an egress queue priority of the prospective virtual circuit in each switch of the plurality of interconnected switches along the candidate path;

determining a total propagation delay across a link between each switch along the candidate path;

determining a total processing delay, the total processing delay comprising a sum of an internal packet processing time of each switch along the candidate path;

identifying a largest packet size of a set of packet sizes of the prospective virtual circuit;

determining a receive time for each ingress port in the candidate path utilizing the largest packet size and an ingress speed of each associated ingress port;

determining a transmit time for each egress port in the candidate path utilizing the largest packet size and an egress speed of each associated egress port;

determining a receive transmit delay for the candidate path, the receive transmit delay comprising a sum of each receive time for each ingress port in the candidate path and the transmit time of a terminal switch of the plurality of interconnected switches;

identifying for each egress port a largest packet size of each existing virtual circuit having an egress queue priority lower than the egress queue priority of the prospective virtual circuit;

determining an interference delay for each egress port in the candidate path using the largest packet size of each existing virtual circuit and the egress speed of each associated egress port;

determining a total aggregation delay for each egress port in the candidate path;

determining a total end-to-end latency for the candidate path as a sum of the total propagation delay, the total processing delay, the receive transmit delay, the interference delay, and the total aggregation delay;

comparing the total end-to-end latency to the maximum latency threshold of the prospective virtual circuit, wherein the prospective virtual circuit is approved if the total end-to-end latency is less than or equal to the maximum latency threshold, and wherein the prospective virtual circuit is rejected if the total end-to-end latency is greater than the maximum latency threshold.

2. The method of claim 1, further comprising redetermining the total end-to-end latency of each of the existing virtual circuits upon approval of the prospective virtual circuit, whereupon a determination of the total end-to-end latency of any of the existing virtual circuits exceeding a corresponding maximum latency threshold, the prospective virtual circuit is rejected.

3. The method of claim 1, wherein determining the total aggregation delay further comprises:

determining a maximum arrival time of a packet of the prospective virtual circuit representative of delays in transmission of packets having an egress queue priority higher than or equal to an egress queue priority of the prospective virtual circuit present in the egress port when the packet of the prospective virtual circuit arrives at the egress port;

determining an initial egress delay representative of one or more packets of the existing virtual circuits having an egress queue priority higher than or equal to the egress queue priority of the prospective virtual circuit arriving at the egress port within the maximum arrival time, the existing virtual circuits sharing the same egress port as the prospective virtual circuit;

determining one or more subsequent egress delays representative of one or more packets of the existing virtual circuits having an egress queue priority higher than the egress queue priority of the prospective virtual circuit arriving after the maximum arrival time and before the packet of the prospective virtual circuit leaves the egress port;

determining the total aggregation delay as a sum of the initial egress delay and each of the one or more subsequent egress delays.

4. The method of claim 3, wherein determining the maximum arrival time further comprises:

for each egress port along the candidate path:

identifying a largest packet size of each existing virtual circuit along the candidate path having an egress queue priority higher than or equal to the egress queue priority of the prospective virtual circuit;

identifying a largest packet size of the prospective virtual circuit;

determining the maximum arrival time as a sum of the largest packet size of each existing virtual circuit and the largest packet size of the prospective virtual circuit, divided by an ingress port speed of the ingress port paired with the egress port.

5. The method of claim 3, wherein determining the initial egress delay further comprises:

identifying a set of existing virtual circuits utilizing the same egress port as the prospective virtual circuit and a different ingress port from the prospective virtual circuit, the set of existing virtual circuits further having an egress queue priority higher than or equal to the egress queue priority of the prospective virtual circuit;

determining for each ingress port a receipt time of a largest packet size of each existing virtual circuit in the set of existing virtual circuits by dividing the largest packet size of each existing virtual circuit in the set of existing virtual circuits by an ingress port speed of the associated ingress port;

defining an ordered descending set of the receipt times of each existing virtual circuit in the set of existing virtual circuits;

summing sequentially from highest to lowest each receipt time of the ordered descending set of the receipt times until summing a sequential receipt time would exceed the maximum arrival time;

selecting a set of packet sizes corresponding to each receipt time in the sum of the ordered descending set of the receipt times of each existing virtual circuit in the set of existing virtual circuits;

determining an initial egress delay as a sum of the largest packet sizes of each existing virtual circuit along the candidate path having an egress queue priority higher than or equal to the prospective virtual circuit and the set of packet sizes, divided by the egress port speed of the associated egress port, and then further reduced by the maximum arrival time.

6. The method of claim 3, wherein determining the one or more subsequent egress delays further comprises:

a) identifying a subset of existing virtual circuits utilizing the same egress port as the prospective virtual circuit and a different ingress port from the prospective virtual circuit, the subset of existing virtual circuits further having an egress queue priority higher than the egress queue priority of the prospective virtual circuit;

b) determining for each ingress port a receipt time of a largest packet size of each existing virtual circuit in the subset of existing virtual circuits by dividing the largest packet size of each existing virtual circuit in the subset of existing virtual circuits by an ingress port speed of the associated ingress port;

c) defining an ordered descending subset of the receipt times of each existing virtual circuit in the subset of existing virtual circuits excluding any receipt times used to determine the initial egress delay;

d) summing sequentially from highest to lowest each receipt time of the ordered descending subset of the receipt times until summing a subsequent receipt time would exceed the initial egress delay;

e) selecting a subset of packet sizes corresponding to each receipt time in the sum of the ordered descending subset of receipt times of each existing virtual circuit in the subset of existing virtual circuits;

f) determining a subsequent egress delay as a sum of the subset of packet sizes divided by the egress port speed of the associated egress port;

g) repeating steps (c) through (f) in an iterative process, replacing the initial egress delay in step (d) with the subsequent egress delay determined in step (f) of the preceding iteration until the subsequent egress delay determined in step (f) is equal to zero;

h) retaining each subsequent egress delay determined in step (g).

7. A latency constrained packet transmission network, comprising:

a plurality of interconnected switches, each switch of the plurality of interconnected switches having one or more ingress ports and one or more egress ports;

one or more existing virtual circuits defined on the latency constrained packet transmission network;

a network management system in communication with the plurality of interconnected switches, wherein the network management system reserves resources for each virtual circuit on the latency constrained packet transmission network by performing the steps:

determining one or more unidirectional candidate paths through the plurality of interconnected switches for a requested prospective virtual circuit having a bandwidth requirement, the prospective virtual circuit defined between two endpoints within the latency constrained packet transmission network and having a maximum latency threshold measured between the two endpoints;

wherein each candidate path is defined as an ordered set of paired ingress ports and egress ports through the plurality of interconnected switches that satisfies a bandwidth limitation of each switch of the plurality of interconnected switches along the candidate path and meets the bandwidth requirement of the prospective virtual circuit;

wherein each paired ingress port and egress port define a switch of the plurality of interconnected switches along the candidate path;

for each candidate path:

identifying an egress queue priority of the prospective virtual circuit in each switch of the plurality of interconnected switches along the candidate path;

determining a total propagation delay across a link between each switch of the plurality of interconnected switches along the candidate path;

determining a total processing delay, the total processing delay comprising a sum of an internal packet processing time of each switch along the candidate path;

identifying a largest packet size of a set of packet sizes of the prospective virtual circuit;

determining a receive time for each ingress port in the candidate path utilizing the largest packet size and an ingress speed of each associated ingress port;

determining a transmit time for each egress port in the candidate path utilizing the largest packet size and an egress speed of each associated egress port;

determining a receive transmit delay for the candidate path, the receive transmit delay comprising a sum of each receive time for each ingress port in the candidate path and the transmit time of a terminal switch of the plurality of interconnected switches;

identifying for each egress port a largest packet size of each existing virtual circuit having an egress queue priority lower than the egress queue priority of the prospective virtual circuit;

determining an interference delay for each egress port in the candidate path using the largest packet size of each existing virtual circuit and the egress speed of each associated egress port;

determining a total aggregation delay for each egress port in the candidate path;

determining a total end-to-end latency for the candidate path as a sum of the total propagation delay, the total processing delay, the receive transmit delay, the interference delay, and the total aggregation delay;

comparing the total end-to-end latency to the maximum latency threshold of the prospective virtual circuit, wherein the prospective virtual circuit is approved if the total end-to-end latency is less than or equal to the maximum latency threshold, and wherein the prospective virtual circuit is rejected if the total end-to-end latency is greater than the maximum latency threshold.

8. The system of claim 7, wherein the network management system further performs the step of redetermining a total end-to-end latency of each of the existing virtual circuits upon approval of the prospective virtual circuit, whereupon a determination of the total end-to-end latency of any of the existing virtual circuits exceeding a corresponding maximum latency threshold, the prospective virtual circuit is rejected.

9. The system of claim 7, wherein determining the total aggregation delay further comprises:

determining a maximum arrival time of a packet of the prospective virtual circuit representative of delays in transmission of packets having an egress queue priority higher than or equal to an egress queue priority of the prospective virtual circuit present in the egress port when the packet of the prospective virtual circuit arrives at the egress port;

determining an initial egress delay representative of one or more packets of the existing virtual circuits having an egress queue priority higher than or equal to the egress queue priority of the prospective virtual circuit arriving at the egress port within the maximum arrival time, the existing virtual circuits sharing the same egress port as the prospective virtual circuit;

determining one or more subsequent egress delays representative of one or more packets of the existing virtual circuits having an egress queue priority higher than the egress queue priority of the prospective virtual circuit arriving after the maximum arrival time and before the packet of the prospective virtual circuit leaves the egress port;

determining the total aggregation delay as a sum of the initial egress delay and each of the one or more subsequent egress delays.

10. The system of claim 9, wherein determining the maximum arrival time further comprises:

for each egress port along the candidate path:

identifying a largest packet size of each existing virtual circuit along the candidate path having an egress queue priority higher than or equal to the egress queue priority of the prospective virtual circuit;

identifying a largest packet size of the prospective virtual circuit;

determining the maximum arrival time as a sum of the largest packet size of each existing virtual circuit and the largest packet size of the prospective virtual circuit, divided by an ingress port speed of the ingress port paired with the egress port.

11. The system of claim 9, wherein determining the initial egress delay further comprises:

identifying a set of existing virtual circuits utilizing the same egress port as the prospective virtual circuit and a different ingress port from the prospective virtual circuit, the set of existing virtual circuits further having an egress queue priority higher than or equal to the egress queue priority of the prospective virtual circuit;

determining for each ingress port a receipt time of a largest packet size of each existing virtual circuit in the set of existing virtual circuits by dividing the largest packet size of each existing virtual circuit in the set of existing virtual circuits by an ingress port speed of the associated ingress port;

defining an ordered descending set of the receipt times of each existing virtual circuit in the set of existing virtual circuits;

summing sequentially from highest to lowest each receipt time of the ordered descending set of the receipt times until summing a sequential receipt time would exceed the maximum arrival time;

selecting a set of packet sizes corresponding to each receipt time in the sum of the ordered descending set of the receipt times of each existing virtual circuit in the set of existing virtual circuits;

determining an initial egress delay as a sum of the largest packet sizes of each existing virtual circuit along the candidate path having an egress queue priority higher than or equal to the prospective virtual circuit and the set of packet sizes, divided by the egress port speed of the associated egress port, and then further reduced by the maximum arrival time.

12. The system of claim 9, wherein determining the one or more subsequent egress delays further comprises:

a) identifying a subset of existing virtual circuits utilizing the same egress port as the prospective virtual circuit and a different ingress port from the prospective virtual circuit, the subset of existing virtual circuits further having an egress queue priority higher than the egress queue priority of the prospective virtual circuit;

b) determining for each ingress port a receipt time of a largest packet size of each existing virtual circuit in the subset of existing virtual circuits by dividing the largest packet size of each existing virtual circuit in the subset of existing virtual circuits by an ingress port speed of the associated ingress port;

c) defining an ordered descending subset of the receipt times of each existing virtual circuit in the subset of existing virtual circuits excluding any receipt times used to determine the initial egress delay;

d) summing sequentially from highest to lowest each receipt time of the ordered descending subset of the receipt times until summing a subsequent receipt time would exceed the initial egress delay;

e) selecting a subset of packet sizes corresponding to each receipt time in the sum of the ordered descending subset of the receipt times of each existing virtual circuit in the subset of existing virtual circuits;

f) determining a subsequent egress delay as the sum of the subset of packet sizes divided by the egress port speed of the associated egress port;

g) repeating steps (c) through (f) in an iterative process, replacing the initial egress delay in step (d) with the subsequent egress delay determined in step (f) of the preceding iteration until the subsequent egress delay determined in step (f) is equal to zero;

h) retaining each subsequent egress delay determined in step (g).

\* \* \* \* \*